United States Patent [19]

Bell

[11] Patent Number: 4,807,095
[45] Date of Patent: Feb. 21, 1989

[54] FIBEROPTICALLY ILLUMINATED TABLE

[76] Inventor: Gerald Bell, 1541 W. Broadway, Anaheim, Calif. 92802

[21] Appl. No.: 180,127

[22] Filed: Apr. 11, 1988

[51] Int. Cl.⁴ .............................................. F21V 33/00
[52] U.S. Cl. ..................................... 362/127; 362/32; 362/806; 108/23
[58] Field of Search ....................... 362/31, 32, 33, 97, 362/145, 127, 134, 253, 806; 108/23

[56] References Cited

U.S. PATENT DOCUMENTS

| | | | |
|---|---|---|---|
| 3,183,815 | 5/1965 | Kapany et al. | 362/32 X |
| 4,120,248 | 10/1978 | Broach | 108/23 |
| 4,745,525 | 5/1988 | Sheehy | 362/32 |

*Primary Examiner*—Stephen F. Husar
*Attorney, Agent, or Firm*—Grant L. Hubbard

[57] ABSTRACT

A table with a planar surface which is wholly or partially transparent lighted by a light remote from the surface, the light being carried from the light to the surface by optical fibers, is disclosed.

7 Claims, 1 Drawing Sheet

U.S. Patent     Feb. 21, 1989     4,807,095
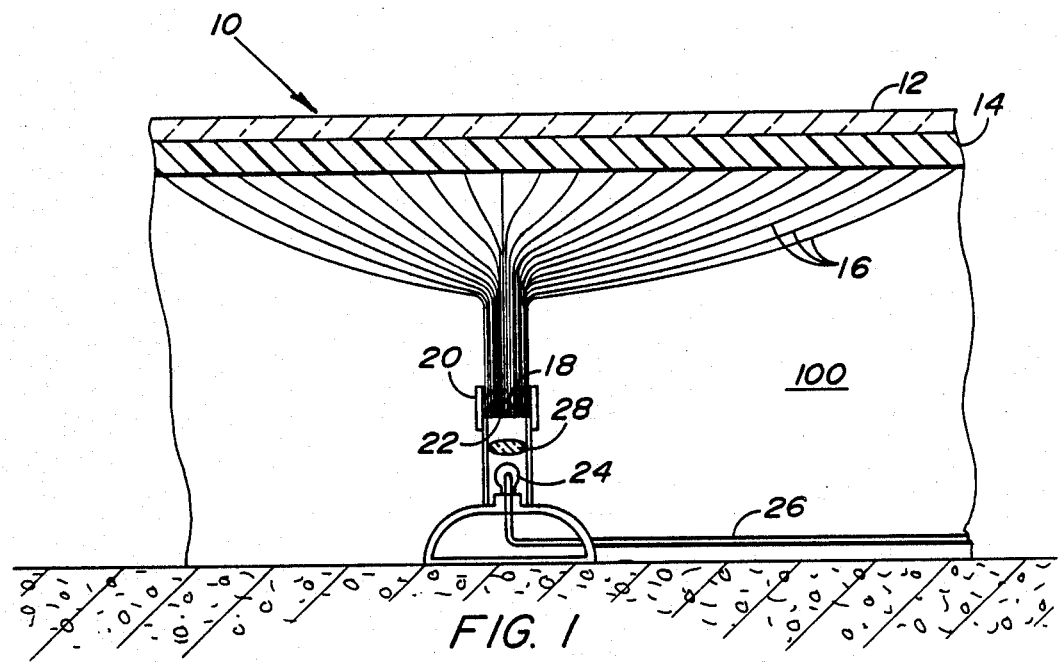
FIG. 1
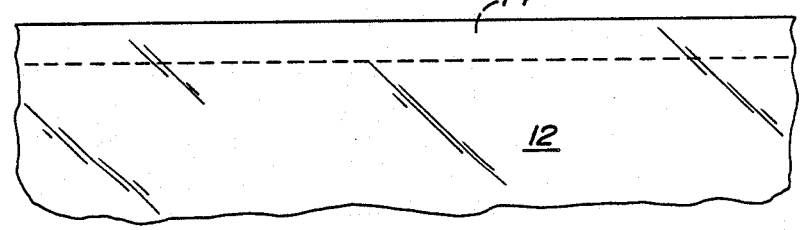
FIG. 2
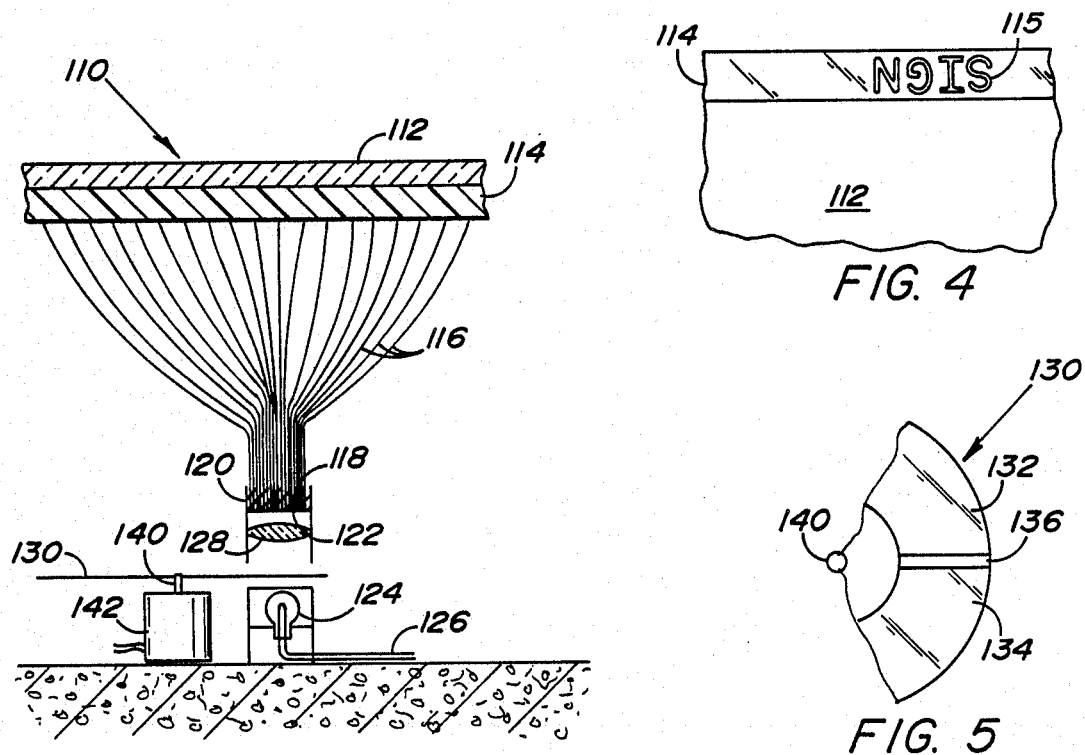
FIG. 3
FIG. 4
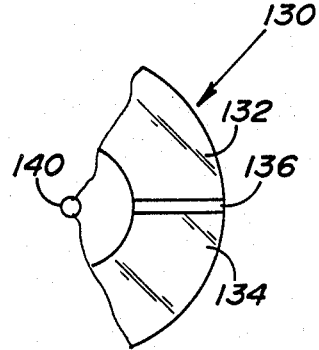
FIG. 5

FIBEROPTICALLY ILLUMINATED TABLE

FIELD OF THE INVENTION

This invention relates to tables, counters and the like, such as furniture which has a generally planar top.

BACKGROUND OF THE INVENTION

Tables and counters are sources of aesthetic contribution and utilitarian objects in virtually every business and dwelling. Tables are made and counters are constructed in virtually any desired shape and size to perform the particular function desired, whether it be aesthetic or utilitarian.

It is known to construct tables which have portions which are illuminated for various reasons. For example, U.S. Pat. No. 4,120,248, to Broach, issued Oct. 17, 1978, describes illuminated decorative tables. Broach discloses a table which has a transparent cover, such a glass and an opaque planar portion. The opaque portion may be made of wood or any other material, such as a sheet of steel or opaque polymer, etc. According to Broach, openings are formed in the opaque planar portion to define a pattern, which may be in virtually any desired configuration. Incandescent or other lights are place beneath the opaque surface in position such that the lights can shine upwardly through the transparent surface. Janssen, U.S. Pat. No. 2,617,917, Nov. 11, 1952, discloses a bed tray which has an illuminated portion to provide light for reading or carrying on other activities.

Chakow, U.S. Pat. No. 2,090,248, Aug. 17, 1937, also discloses a table with a transparent top or planar surface which includes a light below the surface for projecting light from below up through the surface of the table.

Rau, U.S. Pat. No. 3,185,829, May 25, 1965, discloses a dining room table which provides a means for illuminating the table including a tank or reservoir for a liquid and means for lighting the liquid, the light being reflected or transmitted from the liquid through the top of the table, which is transparent in whole or in part.

It is also known to light other planar objects such as dispensing trays to permit the users to better see the objects which are carried on the tray. Such a device is disclosed by Switala in U.S Pat. No. 4,254,452, Mar. 3, 1981.

The use of light for utilitarian and aesthetic purposes is very widely known and, of course, is found in virtually every facet of man's life.

In recent years, fiber optics have become very popular for guiding light from a single source of light to many spaced apart portions of an object or many objects, or to a very small space where the space is too small to hold a light producing source such as a bulb. Fiber optics have, for example, been used in surgical instruments to examine cell structure and the like. Fiber optics also find considerable application in aesthetic devices. By use of fiber optics, light can be guided from a single source into virtually any complex configuration. Null, for example, U.S. Pat. No. 3,389,247, June 18, 1968, discloses a pendulum light source which uses fiber optically transmitted light, and McCaslin, U.S. Pat. No. 4,206,495, discloses a fiber optic light display. The technology of fiber optics is quite well understood and, indeed, the future course of ground based communications is tending strongly toward fiber optic technology.

Notwithstanding the common use of light for aesthetic and utilitarian purposes, the known use of light in furniture such as tables and the like, fiber optics have not been used in any extended way, or perhaps not at all, in the construction and design of furniture. While lighted tables and counters are known, the lights are often difficult to reach and replacement becomes a serious maintenance consideration. In addition, most incandescent lamps, which are the major source of lighting for most such applications, are unreliable and heat producing. Space must be provided and ventilation for dissipating the heat from incandescent light in order to obtain a reasonably usable life and to prevent injury or discomfort to users. For these reasons, and others, the use of light in furniture design has been very limited. A need, therefore, exists for lighted furniture which is easily manufactured, which is easily maintained, which does not generate undue heat or utilize undue power, and which takes advantage of the ability to mold transparent materials into desired shapes. It is a feature and an object of this invention, therefore, to solve this long standing problem in the furniture industry.

SUMMARY OF THE INVENTION

The present invention comprises a counter or a table having formed as an integral part thereof a light source and optical fibers for carrying light to the desired portions of the furniture. In the present discussion, and in the claims, the term "counter" will be used because the invention finds great application in counters in restaurants, service areas, such as reception counters, airline counters, and in areas which are typically not brightly lighted such as in bars and the like. It will be understood, however, the term "counter" simply means any furniture which has a planar or generally planar surface supported above the floor. This, of course, includes tables of any height or construction.

The counter of this invention comprises a generally planar top which comprises or includes one or more transparent portions. The entire top may be transparent, or it may include marble, wood, or some other material which is translucent or opaque. The transparent portion may be glass or polymeric, such as Lucite (a trademark of Du Pont) or Plexi Glass (a trademark of Rohm & Haas) or any other methyl methacrylate, acrylic or other transparent polymer. The counter includes a light source and a multiplicity of fiber optics. Means are provided for coupling light from the light source to the proximal end of the fiber optics and other means are provided for optically coupling light from the distal end of the fiber optics to the transparent portions of the counter for lighting that transparent portion. Thus, those sitting at, approaching, or using the counter, or table as the case may be, can see the lighted portion without having been subjected to the heat of an incandescent lamp. Furthermore, intricate and utilitarian shapes can be formed and lighted to meet the needs of virtually any application.

In one embodiment, means are provided for transmitting variable wavelength light to the fiber optics. This concept, broadly, is well known. For example, it is well known to provide a wheel which has several sectors in it, each having a different color or an assortment of colors. Foster, U.S. Pat. No. 1,351,562, describes a rotating wheel with colored sectors for transmitting light of different colors or different wavelengths, to an illusion apparatus.

One preferred form, the counter is so constructed so that the transparent portion of the top is arranged along the periphery for lighting the edge of the counter, or table. This is particular advantageous where it is important that one know where the edge of the table is to prevent objects from falling off, where it is desirable to attract attention to the edge of the counter to those who may approach it, for advertising or attention getting purposes or any of many other purposes. Indeed, this is one of the most preferred applications of the present inventions but certainly not limiting.

In another form, the invention may include means for forming alpha numeric indicia and for coupling light to these indicia portions to emphasize these portions to thereby convey a message. For example, an opaque layer can be placed adjacent a transparent layer with indicia formed in the opaque layer. The light is then coupled from the fiber optics through or to the transparent indicia portions thus giving a lighted message. Alternatively, all of the transparent area except certain portions can be lighted. Thus providing a light background with dark indicia thereon.

BRIEF DESCRIPTION OF THE DRAWINGS

FIG. 1 is a side view in partial cross-section of a counter according to this invention.

FIG. 2 is a top view partially cut away to correspond to the top of the counter of FIG. 1.

FIG. 3 is a side view of a portion of a counter or table according to this invention shown in somewhat schematic form, showing means for directing light of different colors or wavelengths to portions of the planar surface.

FIG. 4 is a top view of a portion of the counter or table of FIG. 3 showing the arrangement of indicia in the surface.

FIG. 5 is a partial view from the top of a color wheel of the type shown in FIG. 3 used for transmitting light of different wavelengths through the optical fibers to a portion of the planar surface of the counter or table of this invention.

DESCRIPTION OF THE PREFERRED EMBODIMENT

Describing the following embodiment, it is to be understood that the invention is contemplated as the overall combination of the elements and that a great deal of discretion and variation is available to those skilled in the art as to individual components and particular arrangements which will result in the ultimate inventive arrangement and function.

It will also be understood that the drawings and the description are merely exemplary and that a virtually infinite variety of shapes and sizes of furniture may be manufactured without departing from the scope and principle of this invention as described and defined in the appended claims.

Referring now to FIG. 1, the counter or table 10 includes a transparent top 12, in the form of glass, and, in one preferred form, includes a transparent or translucent polymeric planar support sheet 14. Optically coupled to the support sheet, as described in the a foresighted references, are the distal ends of optical fiber 16. Light carried by the fiber 16 light the polymeric sheet 14. The proximal ends 18 of the optical fibers are held in any suitable holding device such as a sleeve 20 against a coupling device or lens 22. In most instances, it is desirable to pot or bond the proximal ends of the fibers together in contact with a lens or simply a transparent piece of glass to permit coupling of the light into the proximal ends of the optical fibers. A light source comprising an incandescent bulb 24, powered through a cord 26, or any other form of light may be provided. In the exemplary embodiment, which, again, is provided only for purposes of amplifying the way the invention can be made. A collimator lens 28 is desirably provided to concentrate the light and direct it along the axis of the optical fibers at the point where the fibers are coupled to the light. The entire top of the counter may be held up by any desired structure, such as the supporting side 100, which may be simply a vertical sheet of plywood, for example, or veneer, sufficient to hold up the counter. Obviously, several sheets or legs or other structures are provided to hold up the top. Since the structure for holding the top is of no criticality, and any such structure can be used, the side of the counter is shown simply for illustrative purposes. Any means for supporting the top above the floor may be used.

Referring now to FIG. 2, it will be seen that the light from the fiber optics is transmitted from the light source through the fiber optics into the edge of the table, where the polymeric sheet 14 is located. The light, then, is transmitted up through the top of the table which is made of glass. Thus, in the particular exemplary embodiment of FIGS. 1 and 2, the edge of the counter is lighted.

Referring now to FIG. 3, the same general construction is shown, the numerals 110 through 128 corresponding, as to structure, with numerals 10 through 28 in FIG. 1. For example, the table 110 includes a top made of glass 112, a polymeric layer which is transparent 114, fiber optics 116, bundled together at 118 by a sleeve 120, receiving light from a coupling means 122 and a light 124 which is powered from any suitable source of electric energy or other energy 126. The light is preferable collimated using a collimating lens or lens system 128.

The structure of FIG. 3 differs in the addition of a color wheel 130 which is supported by a shaft 140 and is rotated by a motor 142. As shown in FIG. 5, the color wheel 130 has segments 132 and 134 and support and bonding segments 136. The segments 132 and 134 and any desired number of other segments may be provided in the wheel, each of which constitutes a transparent, colored sheet of glass or other material constituting a wavelength filter. Thus, depending on the filter, light of any different wavelengths or color may be transmitted through the optics.

Referring now to FIG. 4, it will be noted that indicia, in this case spelling out, simply for example, the word "SIGN" are provided. The ends of the fiber optics 116 are so arranged as to light these indicia. Thus, for example, one approaching a counter in a service establishment or an airline counter, the indicia may spell out an advertisement or identify the person or company providing the services, or simply attract attention. As described, the colors may change on the various parts of the indicia or the colored edge or other structure, using the color wheel. It will be understood, of course, that any means for changing the color or for transmitting any desired wavelength may be used. Since many such means are known, only one is given here as merely exemplary of the invention.

Thus, it will be seen that the invention comprises a table, referred to here generically as a counter, which may be in any construction, size, configuration and may be used for any purpose, which includes a planar top. The planar top comprises a transparent portion or portions. The entire top may be transparent or only portions of the top may be transparent. It is essential, of course, that the top have some transparency. The top is intended to include here the edge of the top of the counter as well as the top surface. For example, the top surface of a glass table could be rendered opaque such that the light would simply radiate out the edges of the top and not upwardly. The invention also includes a light source or a plurality of light sources, although one or two light sources is preferred to many. A multiplicity, sometimes several hundred or even several thousand fiber optics may be used to transmit light from the light source to those portions of the top which are to lighted. Means are provided for coupling the light from the light source to the proximal ends of the fiber optics. Likewise, means are provided for optically coupling light from the distal end of the fiber optics to the transparent portions of the top for lighting all or part of the transparent portions, which may or may not include indicia and which preferably but not necessarily are concentrated along the edge of the top of the counter or table.

In the preferred embodiment the counter includes means for coupling light from the light source to the proximal end of the fiber optics which comprise color filters or other means for transmitting variable wavelength light to these fiber optics. Also in the preferred arrangement, the transparent portion of the top of the counter or table is so constructed and arranged as to be along the periphery of the top for lighting the edge of the counter. In one embodiment, where desired, the transparent portion is so constructed and arranged that indicia are defined therein or in conjunction therewith, e.g. by an opaque layer on or adjacent thereto, and the light is coupled from the optical fibers to or through the transparent areas to thereby emphasize the indicia. All but the indicia may be lighted or only the indicia may be lighted or by appropriate arrangement, using a duplication of light sources as described, one portion of the transparent top portion may be one color and another portion may be a different color thereby emphasizing the indicia.

It will be understood now that many different components may be used to provide particular individual functions. The invention resides in the overall combination and in the result which is attained which is not attained by any table or counter in the prior art.

INDUSTRIAL APPLICATION

This invention finds utility in commerce, in airline counters, in restaurants, in homes and in virtually any other establishment where tables or counters are used.

What is claimed is:
1. A counter comprising, in combination:
   a generally planar top which comprises one or more transparent portions;
   a light source;
   a multiplicity of optical fibers;
   means for coupling light from the light source to a proximal end of the optical fibers; and
   means optically coupling light from the distal end of the optical fibers to the transparent portions for lighting said transparent portion.
2. The counter of claim 1 wherein the means for coupling light from the light source to the proximal end of the optical fibers comprises means for transmitting variable wavelength light to said optical fibers.
3. The counter of claim 2 wherein the transparent portion of the top is constructed and arranged along the periphery of the top for lighting the edge of the counter.
4. The counter of claim 2 wherein the transparent portion of the top forms alphanumeric indicia and wherein the means coupling light to the transparent portion directs the light from the optical fibers to emphasize said indicia.
5. The counter of claim 1 wherein the transparent portion of the top is constructed and arranged along the periphery of the top for lighting the edge of the counter.
6. The counter of claim 1 wherein the transparent portion of the top forms alphanumeric indicia and wherein the means coupling light to the transparent portion directs the light from the optical fibers to emphasize said indicia.
7. The counter of claim 6 wherein the means for coupling light from the light source to the proximal end of the optical fibers comprises means for transmitting variable wavelength light to said optical fibers.

* * * * *